Feb. 8, 1938.                  C. W. BROWN                   2,107,931
         METHOD OF AND APPARATUS FOR ELECTRICALLY COOKING
                    FRANKFURTERS AND OTHER ARTICLES
                         Filed July 20, 1936
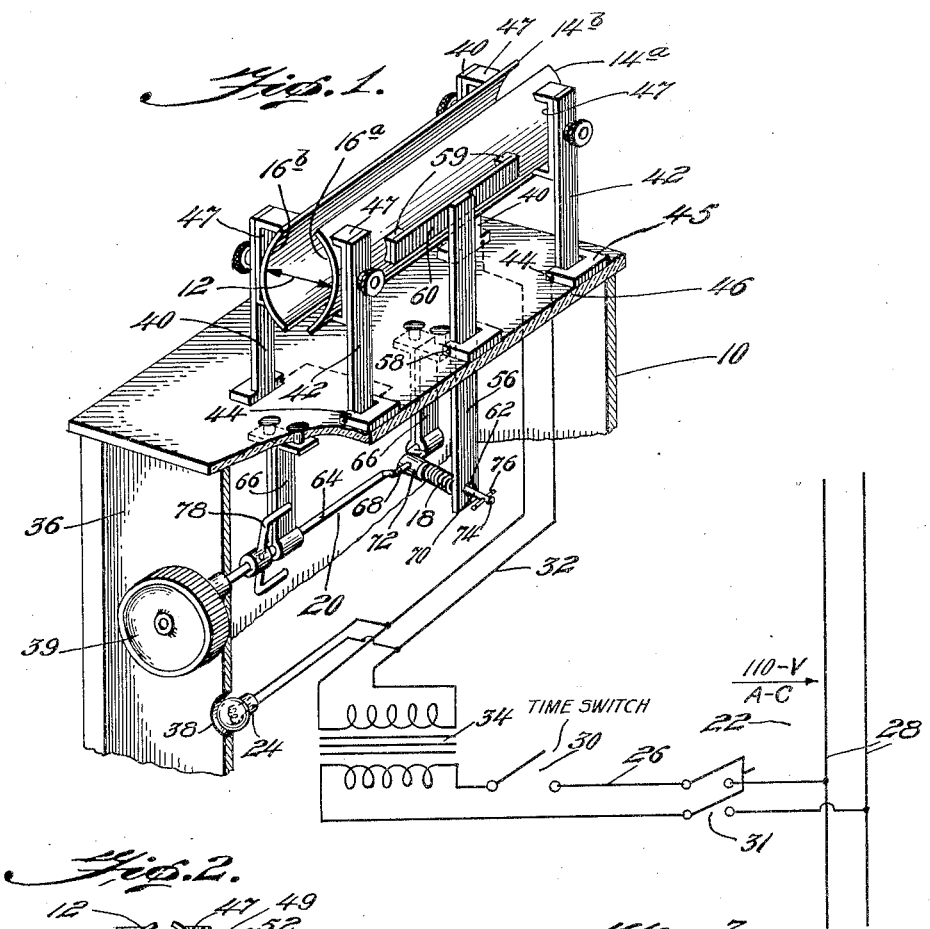
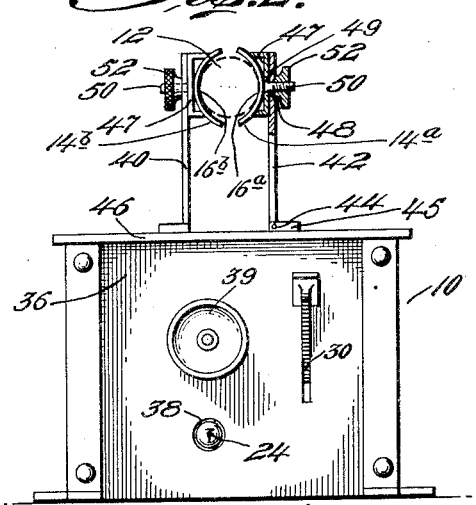
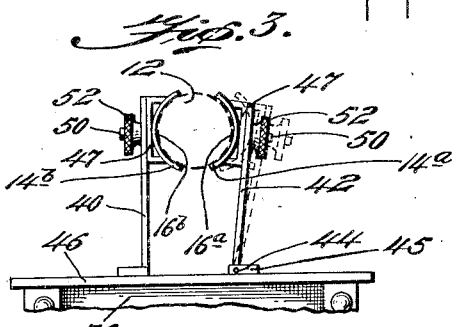
Inventor
Charles W. Brown
By Thomas A. Jenckes
Attorney Patented Feb. 8, 1938

2,107,931

UNITED STATES PATENT OFFICE 2,107,931

METHOD OF AND APPARATUS FOR ELECTRICALLY COOKING FRANKFURTERS AND OTHER ARTICLES

Charles W. Brown, Middleboro, Mass.

Application July 20, 1936, Serial No. 91,494

19 Claims. (Cl. 219—19)

My invention relates to improvements in the method of electrically cooking frankfurters and other articles, and apparatus for use therewith, particularly adapted for use in cooking the types of food likely to expand on the cooking thereof, to cook them uniformly throughout their volume and during the entire cooking operation.

An object of my invention is to provide a novel method and apparatus for cooking by embracing the article to be cooked between relatively movable electrically conductive plates and passing electric current through said plates, keeping the plates themselves in a direct heating contact with the surface of said article to directly cook said article. So far as I am aware I am the first to provide a direct heating electric cooking device of this description, the electric heating elements in the prior art being not mounted in direct contact with the surface of the article to be cooked. I preferably so construct my improved apparatus that the plates may be heated while maintaining a sufficiently low voltage between said plates to substantially prevent current flow through the article to insure the uniformity of heat applied to said article by applying current flow to the heating plates alone.

A further object of my invention is to continuously apply the surfaces of the heating plates to the surface of the article by continuously yieldingly pressing said plates against said article to continuously maintain said plates in heating contact with the surface of the article as said article may expand during cooking.

A further object of my invention is to provide an improved apparatus which may be constructed to permit the ready insertion and removal of the articles to be cooked between the plates.

A further object of my invention is to provide separate oppositely disposed plates relatively movable towards and from each other to accommodate articles of different size. This becomes particularly important in cooking frankfurters where the sizes of the individual frankfurters are apt to vary.

A further object of my invention is to provide means to adjustably vary the time of cooking by varying the time interval during which electric current is passed through said plates to accurately vary the amount of cooking.

A further object in one embodiment of my invention is to provide an instrument box on which my improved heating plates may be conveniently mounted which may readily contain a suitable transformer and a time-controlled switch and a trouble indicating signal lamp in said single instrument box if desired, or which may include said transformer, time-controlled switch and indicating lamp, or any number of them; even if they be not mounted in a box to provide a device which may be readily attached as a unit to the standard type of 110-volt A. C. circuit, and further objects of my invention relate to improvements in the specific circuits I may employ for this purpose, such as connecting the time switch to the primary circuit thereof in order to reduce the amperage which must be interrupted by the switch, and attaching the indicator lamp to the secondary circuit or to the plates so that it may truly indicate the conditions at the vital points and consume a lesser amount of electricity.

A further object of my invention is to provide a device which is entirely automatic in its action and requires no attention during the cooking operation.

A further object of my invention is to provide a novel method of cooking objects by electricity at a much-reduced cost for electric current over any other method hitherto known.

These and such other objects of my invention as may hereinafter appear will be best understood from a description of an embodiment thereof such as is shown in the accompanying drawing.

In the drawing, Fig. 1 is a perspective view of the different parts of my invention in which the electric connections thereof are conveniently mounted in an insulated box and the supports for the cooking plates relatively movably mounted on said box, the electric circuit being shown in the electric diagram.

Fig. 2 is an end elevation of the end of such a box having my invention mounted thereon.

Fig. 3 is a view similar to Fig. 2 but showing the top portion only thereof, including the relatively movable plates after they have relatively moved away from each other as the frankfurter has increased in size during cooking.

In the drawing, wherein like characters of reference generally indicate like parts throughout, 10 generally indicates an electric cooker specifically adapted for cooking tubular articles such as frankfurters in accordance with my improved method. As stated hitherto, my invention includes the improved method of cooking an article, preferably a cylindrical article, such as frankfurters, likely to expand on the cooking thereof, which comprises mounting said article 12 between relatively movable substantially hemi-tubular, electrically conductive plates, 14a and 14b, passing electric current through said plates to heat said plates to cook said article, continuously yieldingly compressing said plates directly against said article to continuously maintain them in heating contact with the surface of said article as said article may expand during cooking, while in my preferred embodiment maintaining a sufficiently low voltage between said plates to substantially prevent current flow through the article, to insure uniformity of heat applied to said article.

I have illustrated in the drawing an improved type of electric cooker for such a purpose capable of carrying out one embodiment of my broad method. Said electric cooker includes two hemi-tubular, preferably thin electrically conductive heating plates 14a and 14b constructed preferably of thin material of approximately .018 in. thick, and preferably constructed of a high resistance nickel alloy capable of being heated to cooking temperature by passage of electric current therethrough, arranged with the concave surfaces 16a and 16b opposed to embrace the frankfurter or other article 12 between them and in movable relationship to each other to vary the distance between them for varying diameters or thicknesses of articles being cooked. I also employ spring means 18 to continuously keep said surfaces 16a and 16b in substantially continuous direct cooking contact with the surface of said article with variations in the size thereof, thus to vary the distance between said plates for variations in the initial size of the articles to be cooked or to yieldingly compensate for variations in the thickness or diameter of the articles being cooked as they may expand or contract during the cooking operation. While in the preferred embodiment shown I have shown said heating plates 14a and 14b as being of hemi-tubular shape with concave surfaces opposite, it is obvious that their shape may be suitably varied to continuously contact the articles of different shape being cooked, such as flat for sandwiches, cup-shaped for hamburgers, waffle-shaped for waffles, etc.

I also provide means 20 for releasing said spring means and relatively moving said plates apart for insertion and removal of said articles to be cooked between them.

To provide means to pass electric current through said plates, I provide an electric circuit 22 connected thereto, and I may provide an indicator lamp 24 connected to said circuit to continuously show if and when the device is operating, and an adjustable time switch 30 of any suitable type, such as is commonly used in waffle or toast cookers today, for varying the time interval during which the plates are electrically heated, or a switch actuated by the expansion of the article being cooked.

While I may employ a single circuit, such as D. C. from a storage battery or other electric source alone, I have shown in my improved embodiment, an improved type of electric circuit which may be connected to a standard type of 110-volt A. C. main house circuit which includes the primary circuit 26 connected to the line circuit 28 through the hand switch 31 if desired, and a secondary circuit 32 having said heating plates 14a and 14b connected therein either in parallel or in series as shown with the transformer 34 interposed between said circuits to reduce the voltage in the secondary circuit to consume a lesser amount of electricity in the somewhat continuous burning of the signal lamp, such current being supplied by the secondary circuit to operatively heat said thin plates. In the preferred embodiment shown, the time switch is preferably connected to the primary circuit 26 in order to reduce the amperage which must be interrupted by the switch, and I preferably connect the indicating lamp 24 to the secondary circuit so that it may truly indicate the conditions at the vital points and consume a lesser amount of electricity.

In the preferred embodiment shown, the primary circuit 26 including its time switch 30 and the main switch 31 except for the contact points or connections thereof with the line circuit 28, the transformer 34, and all portions of the secondary circuit 32, except the plates and supports and an extension handle 39 for operating said means 20, including the indicator lamp, are preferably mounted within a suitably insulated housing or box 36, and the indicator lamp 24 itself mounted to be visible within a suitable hole 38, within said box.

In the embodiment shown, the plate 14b is rigidly mounted on the top of the box, preferably by means of the two spaced supports 40 shown constructed of suitable electrically conductive material such as copper or silver. The plate 14a is pivotally mounted on the top of said box on the two spaced supports 42, pivotally mounted on the top of the container 10 by means of the pivot pins 44. In order to suitably insulate said supports from the electrical connections within said box, I preferably form the top wall 46 of said box of glass or other suitable insulating material, although alternately if desired the bases 45 for mounting of said supports 40 and 42 on said box may be insulated from the top wall of said box.

As stated hitherto, the plates 14a and 14b are removably mounted on the box, and for this purpose I provide each plate 14a and 14b with the U-shaped bracket 47 constructed of suitable electrically conductive material such as copper or silver brazed to or otherwise rigidly mounted on the outer surface thereof, having the U bases opposite suitable holes 48 in the supports 40 and 42, and provided with suitable screw holes 49 therein. I provide the walls of the thin direct heating metallic plates 14a and 14b with the spaced threaded pins 50 projecting diametrically outwardly near each end thereof, and I mount the convex surfaces of said plates within said brackets 47 to have the concave surfaces 16a and 16b thereof face each other and said pins projecting through said holes 48 and 49, and I provide the internally threaded nuts 52 to detachably clamp said pins and plates to said legs. In my preferred embodiment, I preferably construct the spring means to continuously press said surfaces in substantially continuous direct cooking contact with the surface of said article with variations in the size thereof and the means for releasing said spring means for relatively moving said plates apart for insertion and removal of said articles as follows: I provide a lever 56 vertically mounted to have the upper end thereof project above the top 46 of said box and the lower end thereof pivoted on said box by means of the pivot pin 58 on a base suitably mounted on the box top 46. A horizontal bar 60 having insulated end blocks 59 is attached to the upper end of said vertical lever 56 to abut spaced points on the pivoted plate 14a, and said lever 56 is provided with a suitable hole 62 in the lower end thereof. Within said box 10 a crank shaft 64 is mounted to extend horizontally of said box on spaced bearing brackets 66 projecting downwardly from the top of said box, and the operating handle 39 is mounted on an end of said crank shaft 64 projecting exteriorly from said box. Opposite said hole 62 in the lower end of the vertically pivoted lever 56, the crank shaft 64 is provided with a bell crank lever forming U-shaped extension 68 extending in a direction eccentric to the main part of the crank shaft 64. A crank rod 70 is pivotally mounted on said extension eccentrically of said crank shaft and is provided with a stop collar 72 adjacent to the inner end thereof, and the outer end 74 thereof projects outwardly through said hole 62 in said vertically pivoted lever 56. The coil spring 18 forming the spring means heretofore referred to surrounds said rod 70 and has its inner end abutting the stop collar 72 and its outer end abutting the inner face of said vertically pivoted lever 56 around said hole 62. Said rod 70 is also provided with a diametric pin means 76 near the outer end thereof exterior of said lever.

It is thus obvious that on rotation of said bell crank extension 68 towards said vertically pivoted lever 56, said spring may yieldingly force said vertically pivoted lever 56 to move the pivoted plate 14a against the cooking article 12 as said article 12 may expand while cooking from the approximate diameter shown in Fig. 2 to the approximate diameter shown in Fig. 3, and as the expansive force of said article being cooked 12 pivots said plate 14a outwardly the spring 18 may be yieldingly compressed. When, however, the bell crank extension 68 is pivoted by means of the handle 39 away from the lower end of said lever 56, said diametric pin means 76 on said rod 70 may abut the outer face of the lower end of the vertically pivoted lever 56, the spring 18 in the meanwhile expanding to uncompressed position, to pull the lower end of the lever 56 inwardly to pivot the plate 14a away from the plate 14b for removal of said article or insertion of another article to be cooked. If desired, the main crank shaft 64 may be provided with an extension 78 projecting therefrom adapted to abut a bearing bracket 66 after said bell crank extension 68 is pivoted outwardly past dead center to cause the spring 18 to yieldingly hold the lower end of the pivoted lever 56 outwardly to retain said pivoted plate 14a in permanent clamped position, yet permitting yielding movement of said plate 14a, as explained, by the compression of the spring 18. If desired, however, the means 20 for releasing said spring means and relatively moving said plates apart for insertion and removal of said articles may be dispensed with, the spring means 18, however, being retained in some form to permit the yielding expansion of said plates in use.

It is apparent therefore that I have provided a novel method of cooking articles and an embodiment of apparatus for use in carrying out said method with the advantages explained above.

It is understood that my invention is not limited to the specific embodiment shown or method described, and that various devices may be made therefrom without departing from the spirit and scope of the appended claims.

What I claim is:

1. In an electric cooker for cylindrical articles including the types likely to expand on the cooking thereof, comprising in combination, two hemi-tubular thin substantially rigid electrically conductive heating plates capable of being heated to cooking temperature by passage of electric current therethrough and functioning as the sole heating elements, arranged with the concave surfaces thereof opposed to embrace the article between them in movable relationship to vary the distance between them, spring means to continuously press said surfaces in substantially continuous direct cooking contact with the surface of said article with variations in the size thereof, means for releasing said spring means and relatively moving said plates apart for insertion and removal of said articles, an electric circuit connected to said plates to pass current therethrough, an indicator lamp connected to said circuit and an adjustable time-controlled switch for said circuit.

2. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, means for releasing said spring means and relatively moving said plates apart for insertion and removal of said articles, an electric circuit connected to said plates to pass current therethrough, an indicator lamp connected to said circuit and an adjustable time controlled switch for said circuit.

3. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof and an electric circuit connected to said plates to pass current therethrough.

4. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, an electric circuit connected to said plates to pass current therethrough and an indicator lamp connected to said circuit.

5. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, means for releasing said spring means and relatively moving said plates apart for insertion and removal of said articles, and an electric circuit connected to said plates to pass current therethrough.

6. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, an electric circuit connected to said plates to pass current therethrough, and an adjustable time-controlled switch for said circuit.

7. In an electric cooker for cylindrical articles including the types likely to expand on the cooking thereof, comprising in combination, two hemitubular substantially rigid thin electrically conductive heating plates capable of being heated to cooking temperature by passage of electric current therethrough and functioning as the sole heating element, arranged with the concave surfaces thereof opposed to embrace the article between them in movable relationship to vary the distance between them, spring means to continuously press said surfaces in substantially continuous direct cooking contact with the surface of said article with variations in the size thereof, means for releasing said spring means and relatively moving said plates apart for insertion and removal of said articles, a secondary electric circuit connected to said plates to pass current therethrough, a primary A. C. circuit of relatively high voltage, a transformer to reduce the voltage in the primary circuit to a relatively low voltage in said secondary circuit, an indicator lamp connected to said cooking plates, and an adjustable time-controlled switch connected to said primary circuit.

8. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, means for releasing said spring means and relatively moving said plates apart for insertion and removal of said articles, a secondary electric circuit connected to said plates to pass current therethrough, a primary A. C. circuit of relatively high voltage, a transformer to reduce the voltage in the primary circuit to a relatively low voltage in said secondary circuit, an indicator lamp connected to said cooking plates, and an adjustable time-controlled switch connected to said primary circuit.

9. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, a secondary electric circuit connected to said plates to pass current therethrough, a primary A. C. circuit of relatively high voltage, and a transformer to reduce the voltage in the primary circuit to a relatively low voltage in said secondary circuit.

10. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, a secondary electric circuit connected to said plates to pass current therethrough, a primary A. C. circuit of relatively high voltage, a transformer to reduce the voltage in the primary circuit to a relatively low voltage in said secondary circuit, and an indicator lamp connected to said cooking plates.

11. In an electric cooker for articles including the types likely to expand on the cooking thereof, comprising in combination, two thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, a secondary electric circuit connected to said plates to pass current therethrough, a primary A. C. circuit of relatively high voltage, a transformer to reduce the voltage in the primary circuit to a relatively low voltage in said secondary circuit, and an adjustable time-controlled switch connected to said primary circuit.

12. In an electric cooker for articles including the types likely to expand on the cooking thereof, comprising in combination, two thin substantially rigid electrically conductive removably mounted heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof and an electric circuit connected to said plates to pass current therethrough.

13. The method of cooking a cylindrical article including the types likely to expand on the cooking thereof, which comprises embracing said article between relatively movable substantially hemi-tubular electrically conductive plates, passing electric current through said plates to heat said plates to cook said article and continuously yieldingly pressing said plates directly against said article to continuously maintain them in heating contact with the surface thereof as said article may expand during cooking while maintaining a sufficiently low voltage between said plates to substantially prevent current flow through the article to insure the uniform application of heat to said article.

14. The method of cooking an article including the types likely to expand on the cooking thereof, which comprises embracing said article between relatively movable electrically conductive plates, passing electric current through said plates to heat said plates to cook said article and continuously yieldingly pressing said plates directly against said article to continuously maintain them in heating contact with the surface thereof as said article may expand during cooking while maintaining a sufficiently low voltage between said plates to substantially prevent current flow through the article to insure the uniform application of heat to said article.

15. The method of cooking an article including the types likely to expand on the cooking thereof, which comprises embracing said article between relatively movable electrically conductive plates, and passing electric current through said plates to heat said plates to cook said article while maintaining a sufficiently low voltage between said plates to substantially prevent current flow through the article to insure the uniform application of heat to said article.

16. In an electric cooker for articles including the types likely to expand on the cooking thereof, comprising in combination, a plurality of thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, means for releasing said spring means and relatively moving said plates apart for insertion and removal of said articles, an electric circuit connected to said plates to pass current therethrough, an indicator lamp connected to said circuit and an adjustable time-controlled switch for said circuit.

17. In an electric cooker for articles including the types likely to expand on the cooking thereof, comprising in combination, a plurality of thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof and an electric circuit connected to said plates to pass current therethrough.

18. In an electric cooker for articles including the types likely to expand on the cooking thereof, comprising in combination, a plurality of thin substantially rigid electrically conductive heating plates capable of being heated to cooking temperature by passage of electric current therethrough and functioning as the sole heating elements, arranged with the surfaces thereof opposed to embrace the article between them in movable relationship to vary the distance between them, spring means to continuously press said surfaces in substantially continuous direct cooking contact with the surface of said article with variations in the size thereof, an electric circuit connected to said plates to pass current therethrough and an indicator lamp connected to said circuit.

19. In an electric cooker for articles including the types likely to expand on the cooking thereof, comprising, in combination, two thin substantially rigid electrically conductive heating plates capable of being heated to cooking temperature by passage of electric current therethrough and functioning as the sole heating elements, arranged with the surfaces thereof opposed to embrace the article between them and an electric circuit connected to said plates to pass current therethrough.

CHARLES W. BROWN.